United States Patent
Park et al.

(10) Patent No.: US 8,000,500 B2
(45) Date of Patent: Aug. 16, 2011

(54) SYSTEM AND METHOD FOR ANALYZING OF HUMAN MOTION BASED ON SILHOUETTES OF REAL TIME VIDEO STREAM

(75) Inventors: Chan Kyu Park, Daejeon (KR); Joo Chan Sohn, Daejeon (KR); Hyun Kyu Cho, Daejeon (KR); Young Jo Cho, Kyungki-do (KR)

(73) Assignee: Electronics and Telecommunications Research Institute (KR)

(*) Notice: Subject to any disclaimer, the term of this patent is extended or adjusted under 35 U.S.C. 154(b) by 952 days.

(21) Appl. No.: 11/983,138

(22) Filed: Nov. 6, 2007

(65) Prior Publication Data

US 2008/0137950 A1 Jun. 12, 2008

(30) Foreign Application Priority Data

Dec. 7, 2006 (KR) .................. 10-2006-0123837

(51) Int. Cl.
*G06K 9/00* (2006.01)
(52) U.S. Cl. ...................................... 382/107
(58) Field of Classification Search .......... 382/100, 382/103, 107, 115–118; 73/488–496; 348/154–157, 348/169–172; 356/27–30
See application file for complete search history.

(56) References Cited

U.S. PATENT DOCUMENTS

| | | | |
|---|---|---|---|
| 6,226,388 B1 | 5/2001 | Qian et al. | |
| 7,194,114 B2 * | 3/2007 | Schneiderman | 382/118 |
| 7,508,961 B2 * | 3/2009 | Chen et al. | 382/118 |
| 2003/0156756 A1 * | 8/2003 | Gokturk et al. | 382/190 |
| 2006/0269145 A1 * | 11/2006 | Roberts | 382/228 |

FOREIGN PATENT DOCUMENTS

| | | |
|---|---|---|
| JP | 11-96376 A | 4/1999 |
| JP | 2002008041 | 1/2002 |
| KR | 1020040055503 | 6/2004 |
| KR | 1020050048062 | 5/2005 |
| KR | 1020050065198 | 6/2005 |
| KR | 2005-0117276 A | 12/2005 |

* cited by examiner

*Primary Examiner* — Samir Ahmed
*Assistant Examiner* — Atiba Fitzpatrick
(74) *Attorney, Agent, or Firm* — Blakely, Sokoloff, Taylor & Zafman

(57) ABSTRACT

A system and method for analyzing the motions of an object based on the silhouettes of the object are provided. The system includes a foreground detector, a contour extractor, a model generator, a corner histogram generator, and a value of similarity measuring unit. The foreground detector detects a moving foreground object from an input image. The contour extractor extracts silhouette contour of the detected foreground object, and the model generator generates mean value histogram models as references to determine motions of the object. The corner histogram generator generates corner histograms of hierarchical multiband in the extracted contour signal, and the value of similarity measuring unit calculates a value of similarity between the generated corner histogram of a current frame and the average model histogram in a histogram unit, measures a value making a value of similarity with the calculated current frame histogram maximum, and determines the measured value as a posture of the object in the current frame.

18 Claims, 8 Drawing Sheets

SYSTEM AND METHOD FOR ANALYZING OF HUMAN MOTION BASED ON SILHOUETTES OF REAL TIME VIDEO STREAM

CLAIM OF PRIORITY

This application claims the benefit of Korean Patent Application No. 2006-123837 filed on Dec. 7, 2006 in the Korean Intellectual Property Office, the disclosure of which is incorporated herein by reference.

BACKGROUND OF THE INVENTION

1. Field of the Invention

The present invention relates to a system and method for analyzing motions and, more particularly, to a system and method for analyzing the motions of an object based on the silhouettes of the object in video streams that are collected in real time.

This work was supported by the IT R&D program of MIC/IITA[2006-S-026-01, Development of the URC Server Framework for Proactive Robotic Services]

2. Description of the Related Art

In a computer vision field, various researches have been in progress for classifying motion patterns of human from video streams provided from a camera. Since the technologies of the computer vision field require complicated mathematic background and high-technology hardware, it is very difficult to apply the technologies related to the computer vision field into the real life. Especially, the most of technologies related to human motion recognition, including systems and methods, require mass amount of computation.

The technologies of human motion recognition are classified into face recognition, gesture recognition, and motion recognition. The human motion recognition includes three procedures, a preprocessing step, an analysis step, and a recognition step. Since various processes are performed at each of the steps, the human motion recognition may be considered as one huge system.

At the preprocess step, a background is separated from an image. Various methods for separating the background from an image were introduced. These methods have complementary performance characteristics in views of a processing speed and accuracy. For example, if one of the background separation methods has a fast processing speed, it has less accuracy and vice versa.

At the analysis step, meaningful features are extracted to extract the motion patterns of human to analyze. Various feature extracting methods have been researched. In general, a method of extracting morphological features of objects or a method for extracting features by estimating the shape of an object through a probabilistic model has been used. However, these methods have a problem of generating noise while extracting features or a problem of extracting wrong features.

At the recognition step, a statistical probability based recognition method or a learning based recognition method such as a neural network has been widely used. These methods have been actively researched in an artificial intelligent field and a machine learning field. However, these methods require the mass amount of complicated calculation. Therefore, it is difficult to process the recognition step in real time using these methods.

SUMMARY OF THE INVENTION

The present invention has been made to solve the foregoing problems of the prior art and therefore an aspect of the present invention is to provide a system and method for accurately analyzing the motion of an object from the video information of the object.

It is another aspect of the present invention is to provide a system and method for accurately classifying predetermined postures of an object from the video information of the object, and further accurately analyzing the motions of the object according to the classified postures.

According to an aspect of the invention, the invention provides a system for analyzing motions of an object including: a foreground detector for detecting a moving foreground object from an input image except a background image; a contour extractor for extracting silhouette contour of the detected foreground object; a model generator for generating mean value histogram models as references to determine motions of the object from an silhouette image inputted in real time; a corner histogram generator for generating corner histograms for corners of hierarchical multiband in the extracted contour signal; and a value of similarity measuring unit for calculating a value of similarity between the generated corner histogram of a current frame and the average model histogram in a histogram unit, measuring a value making a value of similarity with the calculated current frame histogram maximum, and determining the measured value as a posture of the object in the current frame.

The system may further include a filter for removing noise images from the foreground object image detected from the foreground detector and outputting the noise removed image to the contour extractor. The filter may be a low band pass filter or a morphological filter.

The system may further include a background model manager disposed at the front of the foreground detector for generating a Gaussian mixture background for input image frames. The foreground detector may detect the foreground object making motions at a still background using differences between a background of the Gaussian mixture background model outputted from the background model manager and real-time input video frame.

The system may further include an image initializing unit for initializing the video frames for generating the Gaussian mixture background and outputting the initialized video frame to the background model manager.

The system may further include a camera unit for capturing video stream in real time through a camera and outputting the captured video stream to the image initializing unit and the foreground detector.

The corner points may include at least one of a head, a hand, a leg, an armpit, a shoulder, and a knee of the object.

The system may further include a storing unit for storing average histogram models of each posture of the object, which are generated from the model generator.

The postures of the object may include at least one of a posture of standing up, a posture of sitting down, and a posture of laying down.

The model generator may include: a silhouette contour collector for collecting videos of postures of the object, and a front view, a left side view, a right side view, and a rear view of each of the postures; and an mean value calculator for calculating mean values of the front view, the left side view, the right side view, and the rear view of each of the postures of the object by accumulating the collected videos, and storing the calculated mean values in the storing unit.

The corner histogram generator may include: a centroid point calculator for calculating a weight centroid point of a silhouette in a silhouette object contour image inputted from the contour extractor; an Euclidean distance calculator for calculating an Euclidean distance from the weight centroid point to predetermined points along the contour from a predetermined start point; a multiband wavelet filter for dividing the Euclidean distance information into multi sub-band; and a multiband corner histogram generator for generating corner histograms by extracting corners with positions thereof not varied form the divided multi sub-band signals.

The multiband wavelet filter may divide the Euclidean distance information into eight multi sub-bands.

According to the another aspect of the invention, the invention provides a method for analyzing motions of an object based on a silhouette of the object in video streams, including: collecting video streams in real time; detecting foreground objects making motions at a still background from the collected video stream; filtering the detected foreground object image to remove noise images therefrom; extracting contours of a silhouette from the noise removed object silhouette image; generating a mean value histogram model as a reference to determine motions of the object from the real time input silhouette image; generating a corner histogram in consideration of multiband feature of corner points from the extracted contour signal; calculating a value of similarity between the generated corner histogram of a current frame and the average model histogram, and measuring a value making a value of similarity to the calculated histogram of a current frame maximum; and determining the histogram of the measured maximum value of similarity as a current frame posture of the object.

The step of generating the average histogram model may include: collecting silhouette contour image information of each posture of the object; generating the corner histogram for the collected image information; accumulating videos of the corner histograms to calculate an mean value of each posture; calculating an mean value of each posture from the accumulated corner histograms; and storing the calculated mean value of each posture.

The postures of the object may include at least one of a posture of standing up, a posture of sitting down, and a posture of laying down of the object.

The posture of the object may further include at least one of a front view, a left side view, a right side view, and a rear view of each of the postures of the object.

The corners may include at least one of a head, a hand, a leg, an armpit, a shoulder, and a knee.

The step of generating the corner histogram may include: calculating a weight centroid point of the silhouette object contour image; calculating Euclidean distances from the weight centroid point to predetermined points on the contour from a predetermined start point along the entire contour; dividing the Euclidean distance signal into multi sub-bands through multiband wavelet filtering; and generating the corner histogram by extracting corners having a position not varied up to a scale of $2^3$ for the filtered multiple band signals.

In the invention, in order to accurately analyze three postures (a standing up posture, a sitting down posture, and a laying down posture) from consecutive video stream, mean value models of three postures, which are generated using histograms of corner feature points in a human shape through a wavelet filter bank of a silhouette contour image, are introduced as a determination reference, and a method for analyzing consecutive motions of a human by calculating a maximum value of similarity between a silhouette human image extracted from video frames inputted in real time and a corner histogram is proposed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Certain embodiments of the present invention will now be described in detail with reference to the accompanying drawings.

Figure 1:
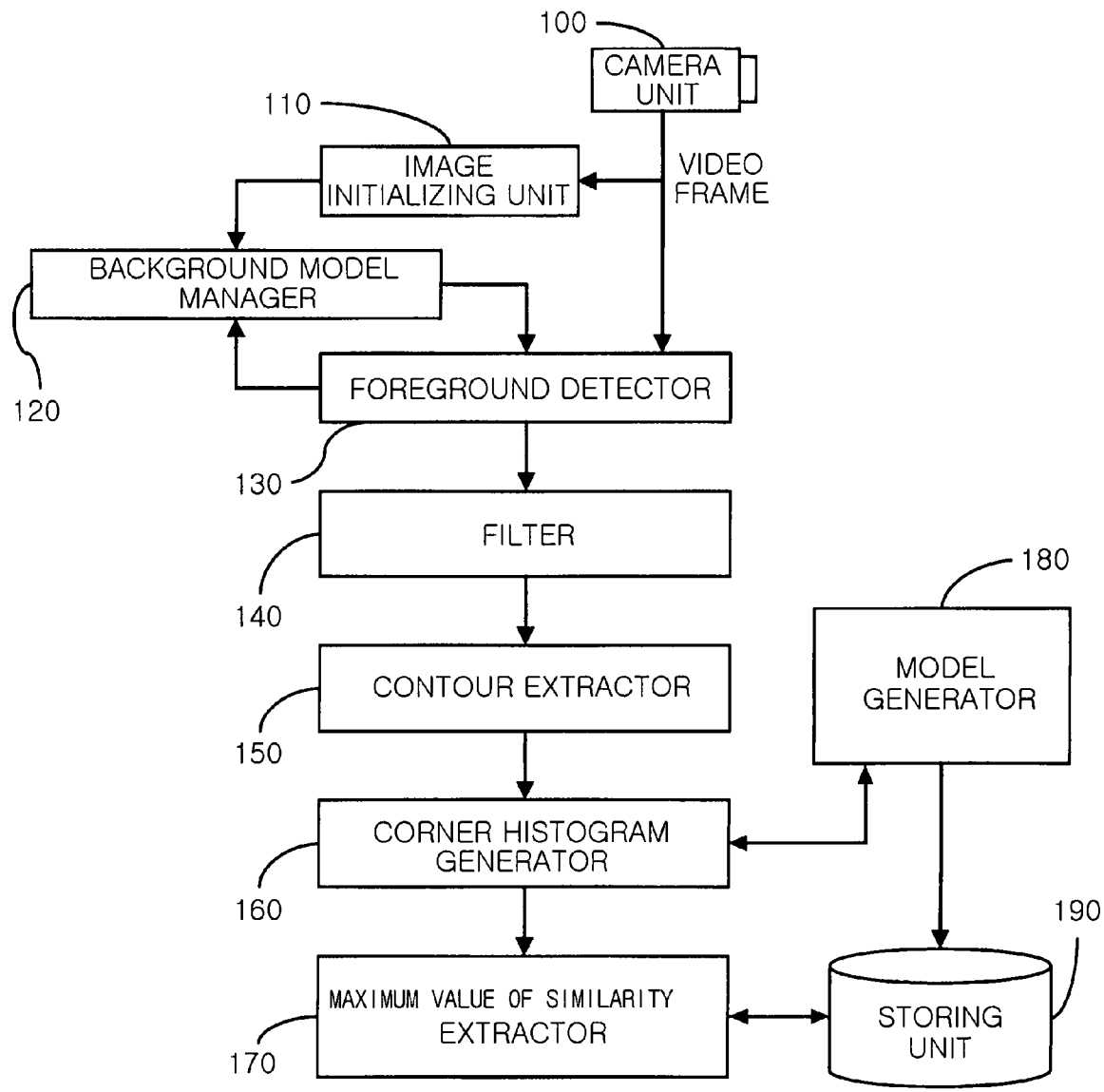
FIG. 1 is a block diagram illustrating a system for analyzing the motions of an object based on the silhouettes of the object in video streams according to an embodiment of the present invention.

FIG. 1 is a block diagram illustrating a system for analyzing the motions of an object based on the silhouettes of the object in video streams according to an embodiment of the present invention.

The present embodiment will be described with a human as an example of an object throughout the specification. The object, however, can be one of lives that can automatically and manually make motions or objects such as robots making motions using electric power.

Referring to FIG. 1, the object motion analysis system includes a camera unit 100, an image initializing unit 110, a background model manager 120, a foreground detector 130, a filter 140, a contour extractor 120, a corner histogram generator 160, a maximum value of similarity extractor 170, a model generator 180, and a storing unit 190.

The camera unit 100 transmits video stream captured from a camera disposed at an indoor environment in real time to the inside of the system.

The image initializing unit 110 initializes video frames inputted from the camera unit 110 in real time for generating a Gaussian mixture model.

The background model manager 120 receives the initialized video frames, generates a Gaussian mixture background, and sustains the Gaussian mixture background.

The foreground detector 130 extracts an human object than makes motions at a still background as an foreground object using differences between the background of the generated Gaussian mixture background model and a video frame currently inputted from the camera 100 in real time. In order to update the background model according to peripheral illumination and brightness variation, the foreground detector 130 feeds the results back to the background model manager 120. Accordingly, the optimal foreground object can be separated from the background. The extracted foreground object is called a silhouette based human foreground object, and it is used as basic data to analyze motions. However, the silhouette image includes noise images generated from the background separation. Therefore, a low pass band filter and a morphological filter are used to remove the noise image therein.

The filter 140 removes the noise images from the silhouette based human foreground object image. In the present embodiment, the low pass band filter and the morphological filter can be used as the filter 140.

After removing the noises from the filtered human silhouette image, the contour extractor 150 extracts the contour of the silhouette using a boundary operand in order to allow the morphological analysis of human.

The corner histogram generator 160 calculates a weight centroid of the contour image formed of the extracted silhouette based human contours, and calculates Euclidean distances from the calculated central point to predetermined points on the contour from a predetermined start point along the contour. The corner histogram generator 160 considers the calculated Euclidean distances as a discrete signal and extracts feature points from the discrete signal for a reference to determine the motions of a human. While extracting the feature points, the corner histogram generator 160 extracts local maximum values which can be the feature of a corresponding band in multiband domain. In the present embodiment, a wavelet filter bank (not shown) with Gaussian function is used to extract the local maximum values.

The corner histogram generator 160 reconfigures histograms that sustain the local maximum value of each band in the distance signal passing through the filter bank. After calculating the histograms for a current silhouette frame, the corner histogram generator 160 creates mean value histograms of n sets of sample data, where each set includes total 12 sample data including three motion postures, and a front view, a left side view, a right side view, and a rear view of each posture.

The maximum value of similarity measuring unit 170 calculates a value that makes the value of similarity between the calculated mean value histograms and a histogram calculated from a current frame maximum. The maximum value of similarity measuring unit 170 can determine that a histogram having the maximum value of similarity is a posture expressed in a current frame by calculating the value of similarities between the mean value histograms per each posture and a value of similarity of a current frame histogram.

The model generator 180 generates a mean value histogram model from previously recorded sample data as a reference to determine the motion of human in a silhouette image inputted in real time. In order to generate the mean value histogram model, the model generator 180 calculates corner histograms of each posture and calculates the average thereof by accumulating the calculated histograms.

The storing unit 190 stores the mean value histogram model per each posture, generated from the model generator 180.

Figure 2:
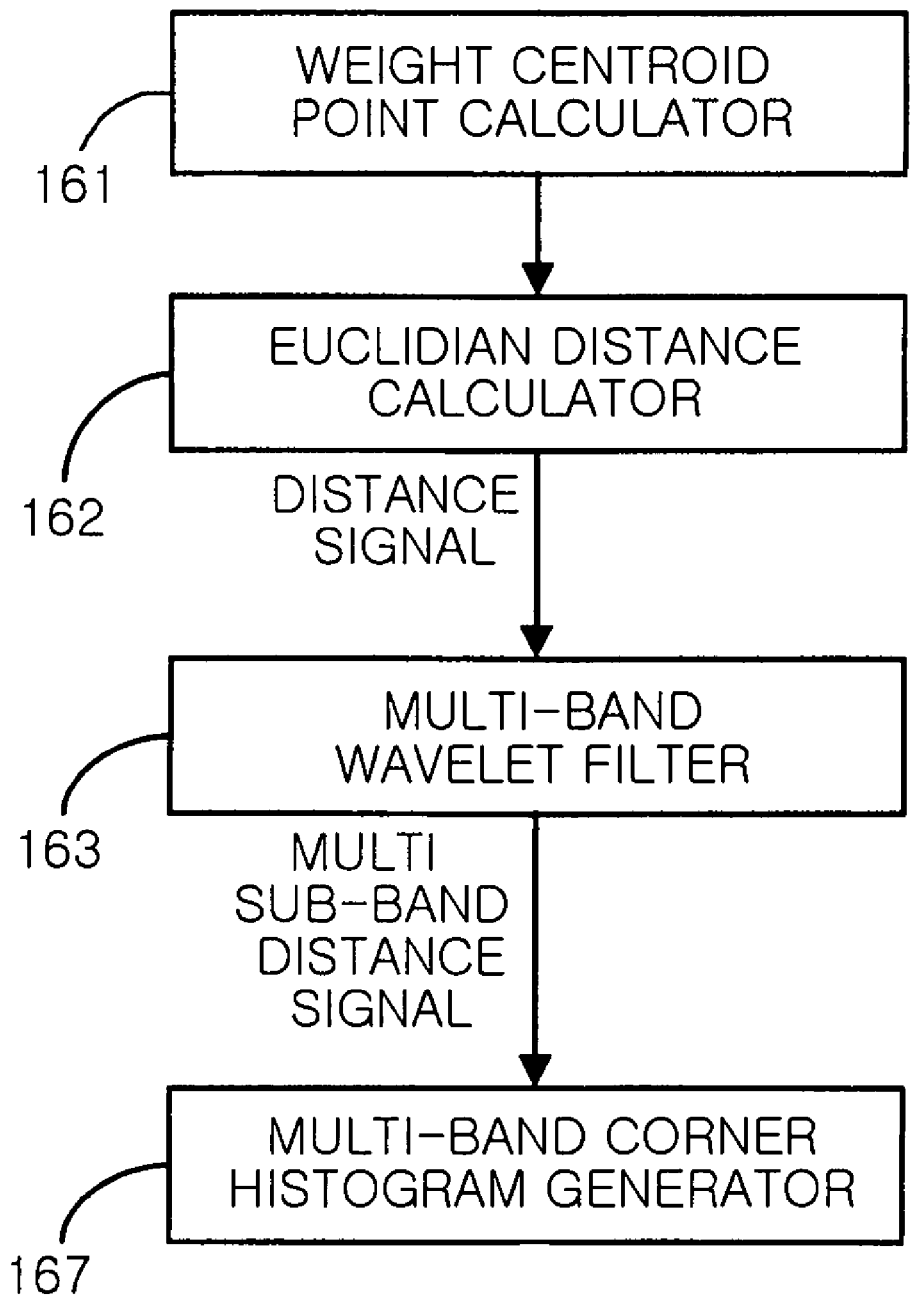
FIG. 2 is a block diagram illustrating a corner histogram generator shown in FIG. 1.

FIG. 2 is a block diagram illustrating a corner histogram generator shown in FIG. 1. As described above, the corner histogram generator calculates multi-band histograms representing human contour information in a current silhouette image.

Referring to FIG. 2, the corner histogram generator 160 includes a weight centroid point calculator 161, a Euclidian distance calculator 162, a multi-band wavelet filter 163, and a multi-band corner histogram generator 167.

The centroid point calculator 161 receives a silhouette human contour image and calculates a centroid point of silhouette.

The Euclidean distance calculator 162 calculates Euclidean distances from the centroid point calculated from the centroid calculator 161 to predetermine points on the contour along the contour from a predetermined start point.

Figure 3:
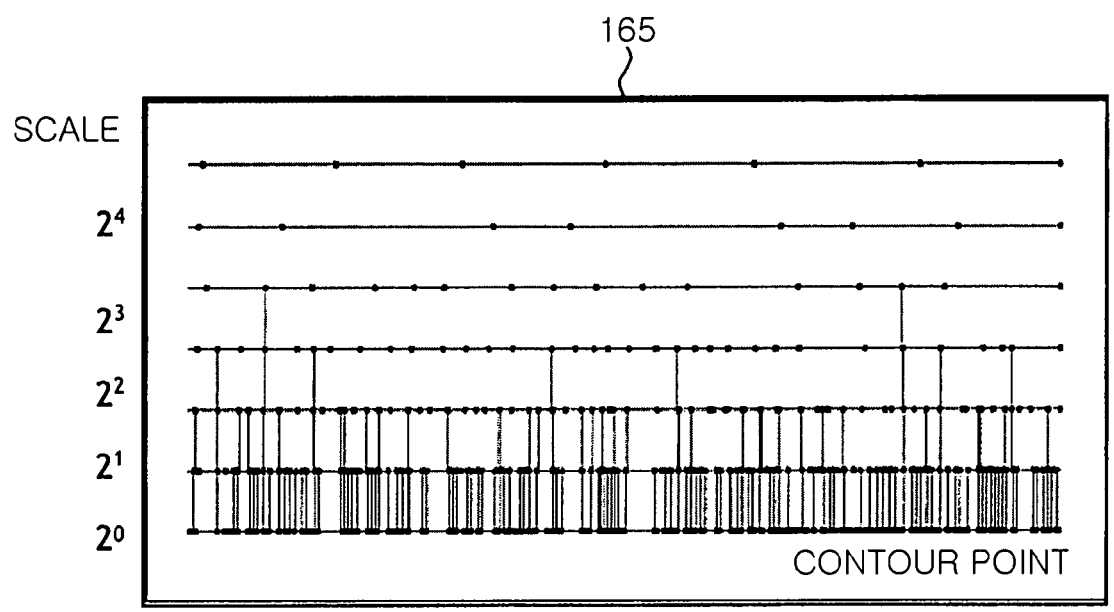
FIG. 3 is a graph showing scale values for contour positions in a multi sub-band distance signal obtained from a multiband wavelet filter shown in FIG. 2.

The multiband wavelet filter 163 divides the distance signal calculated from the Euclidean distance calculator 162 into eight multi sub-bands. FIG. 3 is a graph showing scale values for contour positions in a multi sub-band distance signal obtained from a multiband wavelet filter shown in FIG. 2. By dividing, a lot of local maximum values, corners, can be detected from the distance signal because the contour has rough high frequency components at low scale. When the scale becomes larger, the signal becomes significantly smoothed. As a result, the high frequency components are removed at a scale of $2^3$, thereby losing the meaning of corner feature.

Figure 4:
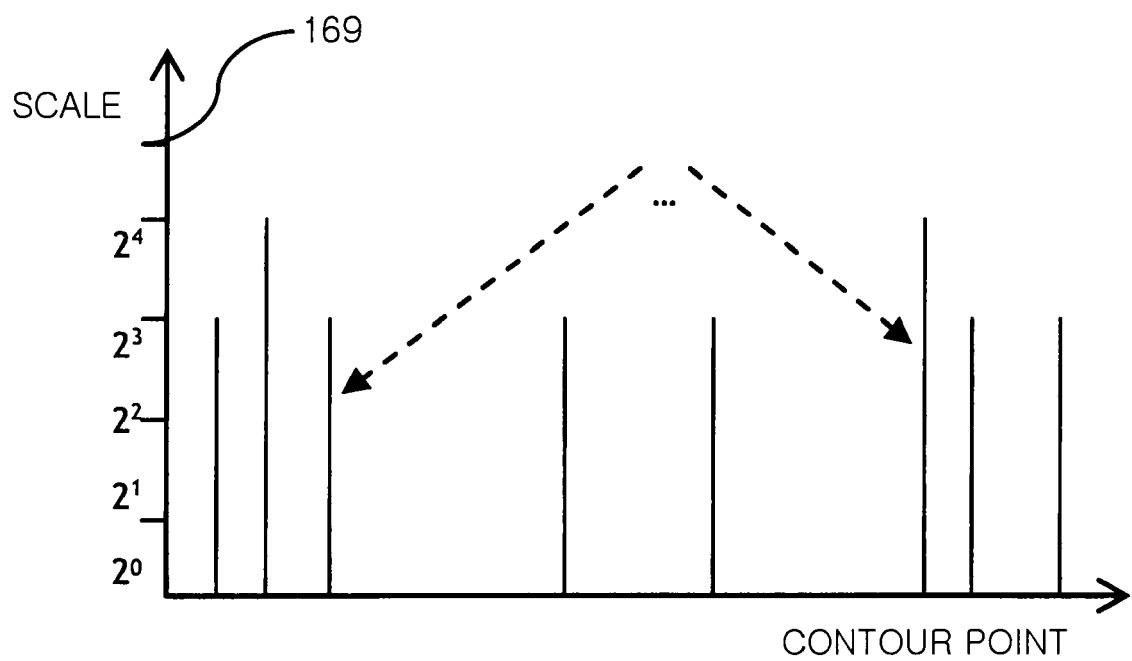
FIG. 4 is a graph showing a corner histogram feature value through scales of contour positions obtained from a multiband corner histogram according to an embodiment of the present invention.

The multiband corner histogram generator 167 sustains features of various band signals up to the scale of $2^3$. There is no meaning if the scale becomes higher than $2^3$. The multiband corner histogram generator 167 generates corner histograms by extracting corners with corner values not changed up to $2^3$. FIG. 4 is a graph showing a corner histogram feature value through scales of contour positions obtained from a multiband corner histogram according to an embodiment of the present invention. As shown in FIG. 4, the feature values of corner histograms generated by the multi-band corner histogram generator 167 are values up to a scale of $2^3$. Therefore, up to eight feature values can be obtained.

Figure 5:
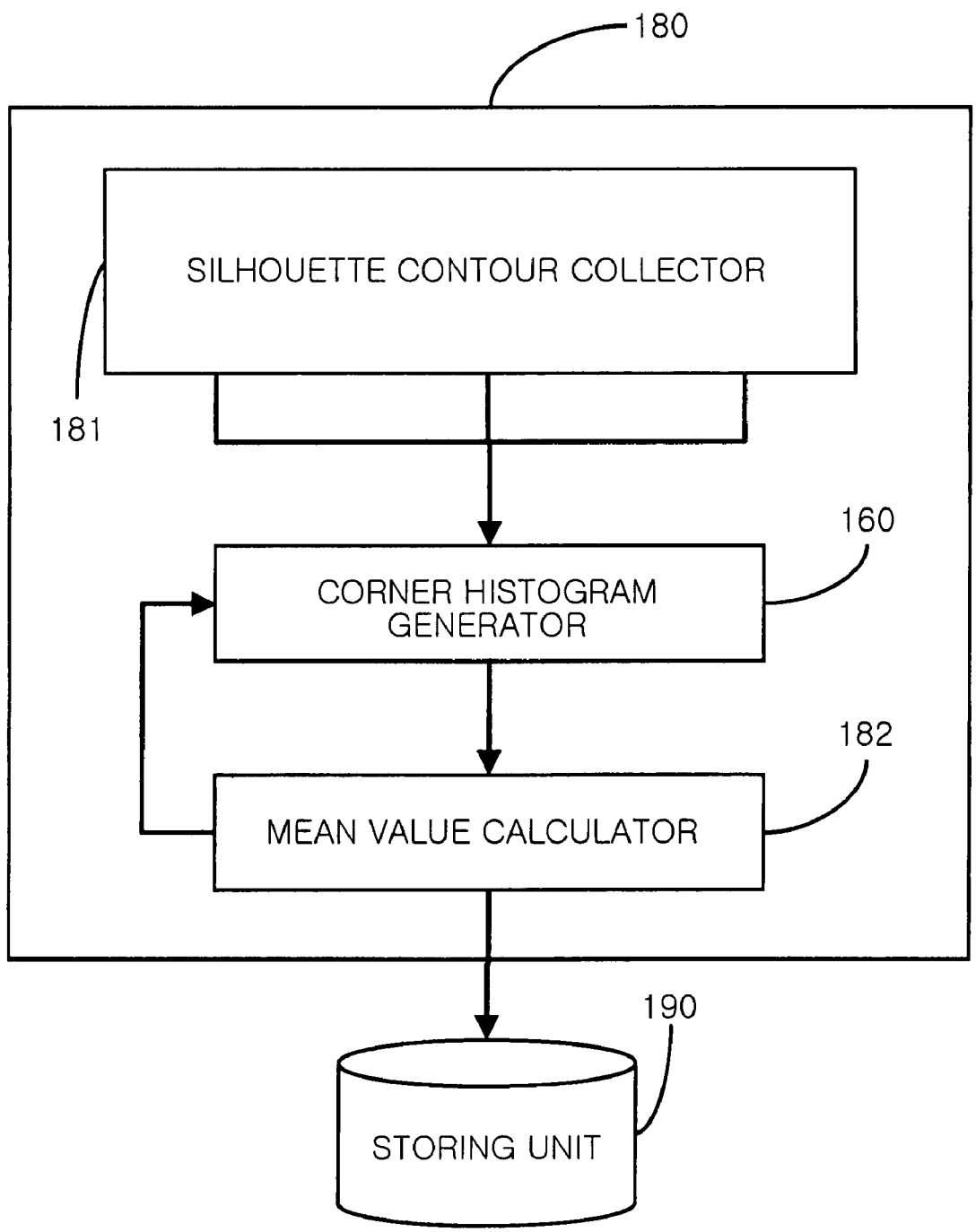
FIG. 5 is a block diagram illustrating a model generator shown in FIG. 1.

FIG. 5 is a block diagram illustrating a model generator shown in FIG. 1. As described above, the model generator generates a mean value histogram from sample data as a reference to determine the motion of a human in a silhouette image inputted in real time.

Referring to FIG. 5, the model generator 180 includes a silhouette contour collector 181, and a mean value calculator 182.

In the present embodiment, models to determine are required in advance to analyze motion patterns of human. In case of previously creating models, it is possible to make accurate decision by maximizing a rate of recognizing motions. However, if the created models are complicated or require the large amount of computation, it is difficult to apply the created models in real time.

Since the created models are simple histogram type data and the number of data is not large, it can be embodied in real time with low cost hardware.

The silhouette contour collector 181 needs to prepare first sample data. In general, three postures of human, and a front view, side views, and a rear view of each posture are recorded. It preferable to record samples from a lot of human. Such a recorded video inputs to the corner histogram generator 160 and are processed in a frame unit.

The mean value calculator 182 accumulates recorded video for calculating the mean values of each posture. The mean value calculator 182 continually generates histograms and accumulates the generated histograms to calculate all sample data as described above. After all sample data are accumulated, the mean value calculator 182 calculates mean values of three postures, a posture of standing up, a posture of sitting down, and a posture of laying down, each including both side views and a rear view. Such calculated mean values per each posture are stored in the storing unit 190.

Figure 6:
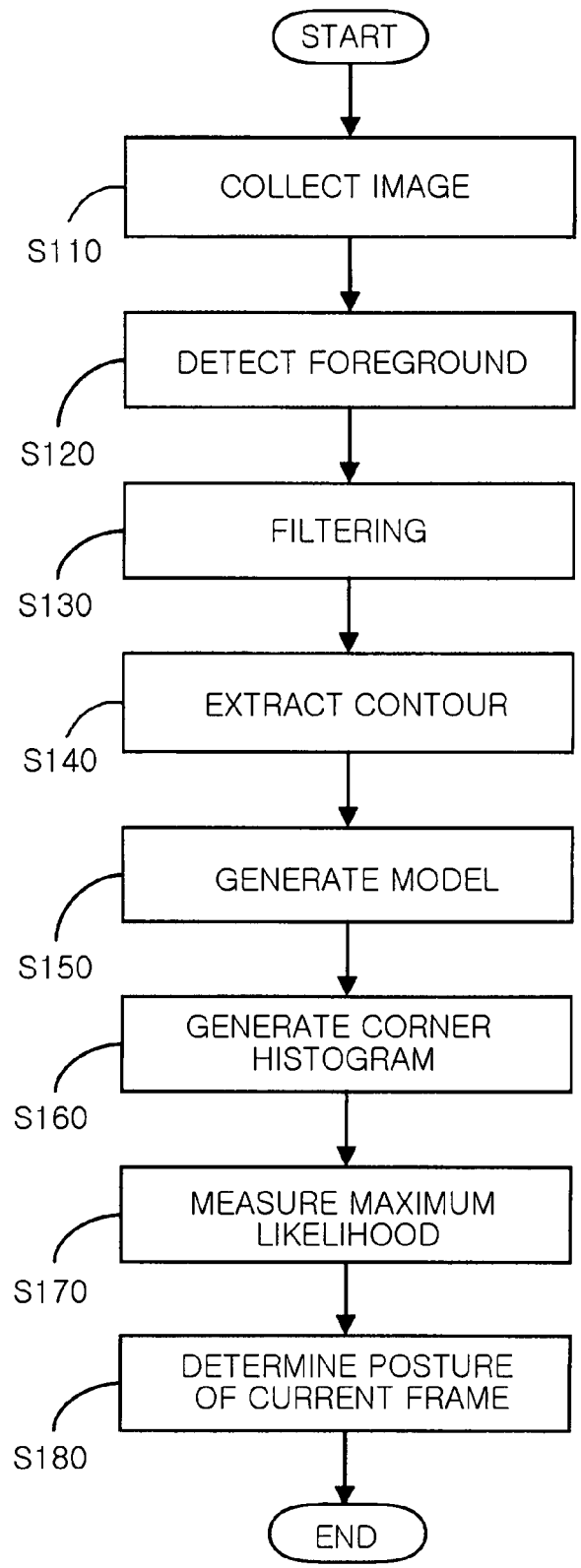
FIG. 6 is a flowchart illustrating a method for analyzing the motions of an object based on the silhouettes of the object in video streams according to an embodiment of the present invention.

FIG. 6 is a flowchart illustrating a method for analyzing the motions of an object based on the silhouettes of the object in video streams according to an embodiment of the present invention. In the present embodiment, the method for analyzing the motions of an object is performed through the system for analyzing the motions of an object shown in FIG. 1.

Referring to FIG. 6, the object motion analysis system collects videos in real time through the camera unit 100 disposed at the indoor environment and inputs the collected video stream at step S110.

The object motion analysis system initializes the input video frames through the image initializing unit 110, and creates a Gaussian mixture background through the background model manager 120. The object motion analysis system extracts human object making motions at a still background as foreground objects using differences between the background of the Gaussian mixture background model generated through the foreground detector 130 and a video frame of a current time, which is captured and transmitted from the camera unit 100 in real time, at step S120.

Then, the filter 140 of the object motion analysis system filters noise images from the silhouette based human foreground object image at step S130.

The contour extractor 150 of the object motion analysis system extracts the contour of silhouette using a boundary operand for morphological analysis of human at step S140.

The model generator 180 of the object motion analysis system generates a mean value histogram model from previously recorded sample data as a reference to determine the motion made by human from the silhouette image inputted in real time through the model generator 180.

For example, the model generator 180 creates total 12 histograms using n recorded data of each of three postures including a front view, side views, and a rear view. That is, the model generator 180 calculates 12 average histograms using n data of each posture, and uses 12 mean values as value of similarity measurements when measuring the value of similarity, thereby reducing the amount of calculation for (n−1)× 12 data.

The corner histogram generator 160 of the object motion analysis system transforms the contour signal extracted from the contour extractor 150 to a distance signal, extracts corner points which are features in hierarchically multiband through a wavelet filter bank, and creates corner histogram in consideration of multiband feature of the extracted corners at step S160. The corners, for example, may be a head, a hand, a leg, an armpit, a shoulder, and a knee.

The maximum value of similarity measuring unit 170 of the object motion analysis system calculates a value of similarity between the corner histogram of the current frame and the mean value model histogram in a histogram unit, and calculates a value making a value of similarity to the histogram calculated from the current frame maximum at step S170.

Accordingly, the maximum value of similarity measuring unit 170 of the object motion analysis system determines that the histogram of the measured maximum value of similarity denotes a posture of the current frame at step S180.

Figure 7:
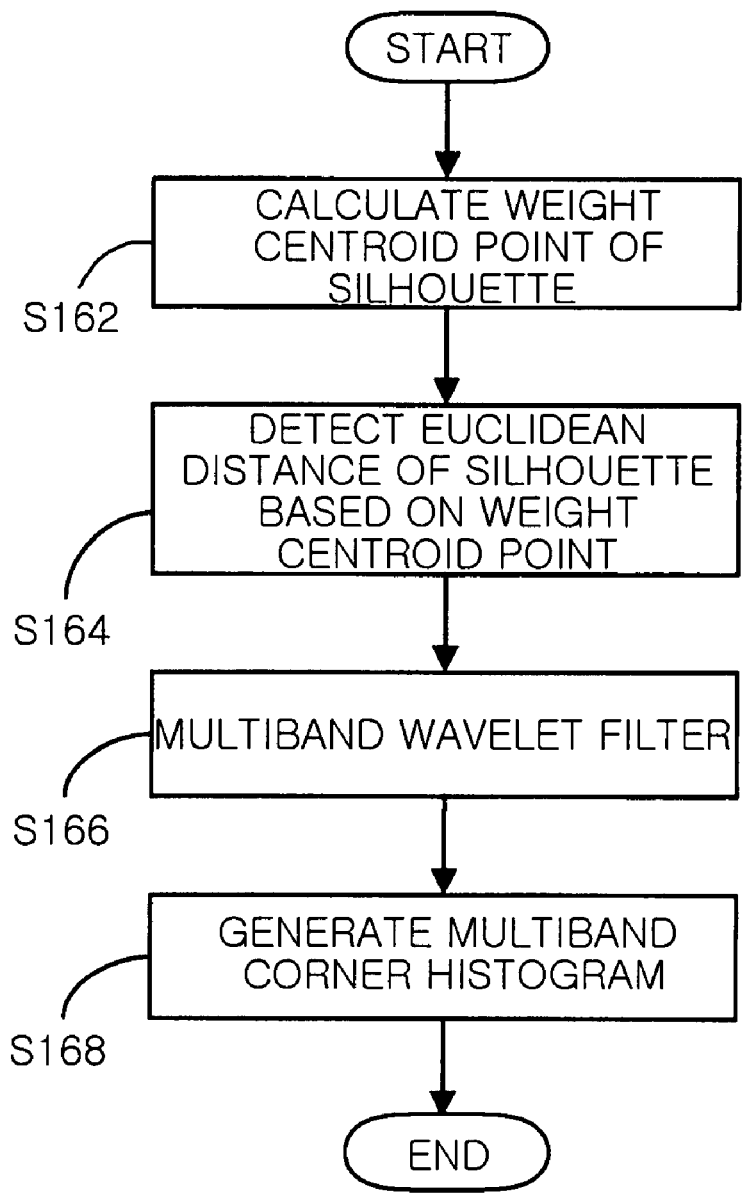
FIG. 7 is a flowchart illustrating a corner histogram generation step in FIG. 6.

FIG. 7 is a flowchart illustrating a corner histogram generation step in FIG. 6.

As shown in FIG. 7, the corner histogram generator 160 calculates a centroid point of silhouette in the silhouette human contour image at step S162.

The corner histogram generator 160 calculates Euclidean distances from the centroid point to predetermined points on the contour from a predetermined start point along the contour at step S164.

The corner histogram generator 160 divides the distance signals calculated from the Euclidean distance calculator 162 into eight multi sub-bands as shown in FIG. 3 through multi band wavelet filtering at step S166.

The corner histogram generator 160 sustains features of the filtered multi band signals up to a scale of $2^3$ through the multiband corner histogram generator 167. The corner histogram generator 160 extracts corners with the position thereof not changed up to the scale of $2^3$ and generates the corner histogram as like FIG. 4 at step S168.

Figure 8:
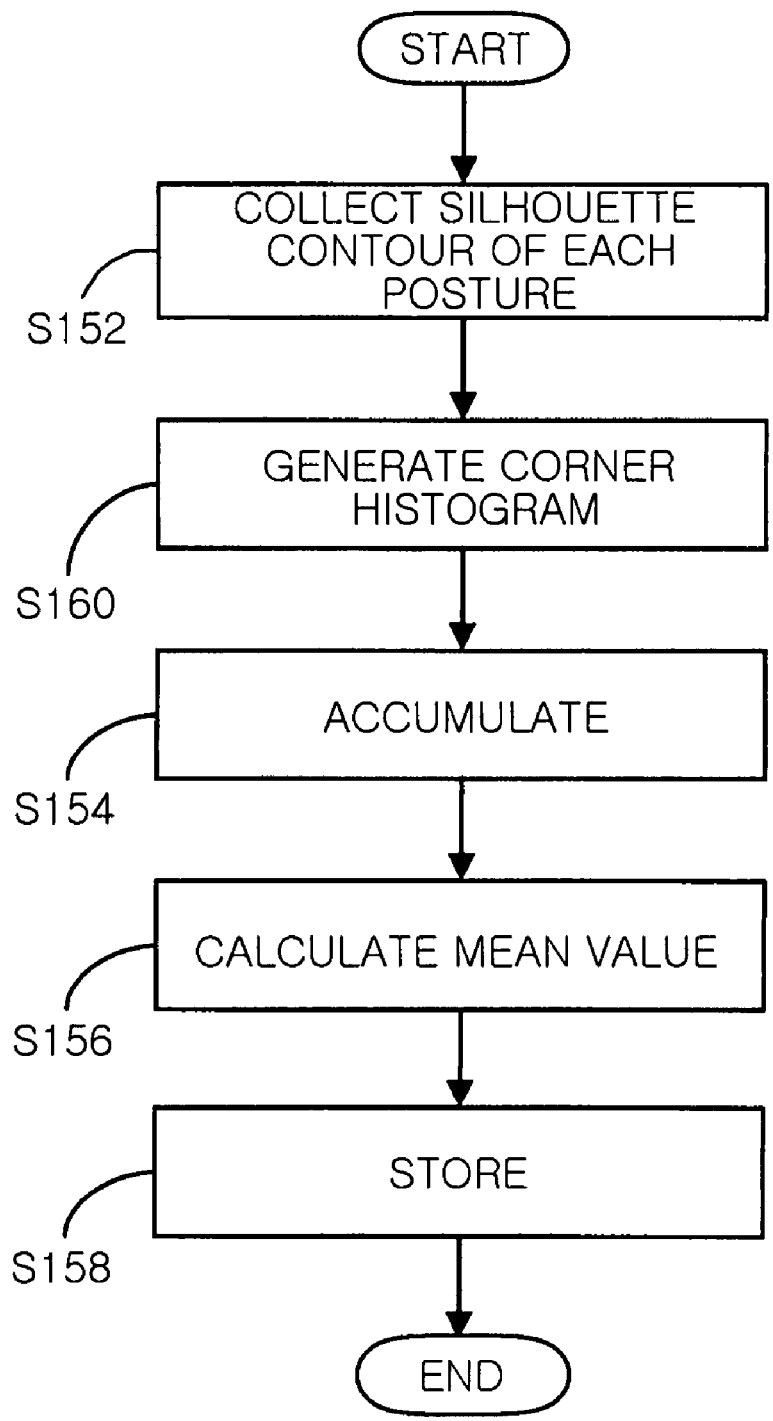
FIG. 8 is a flowchart illustrating a model generation step shown in FIG. 6.

FIG. 8 is a flowchart illustrating a model generation step shown in FIG. 6.

As shown in FIG. 8, the model generator 180 needs to prepare first sample data through the silhouette contour collector 181. In general, three postures of human, a front view, both side views, and a rear view of each of the three postures, are recorded, and it is preferable to record a lot of human at step S152. Such recorded video inputs into the corner histogram generator 160 and processed in a frame unit.

As shown in FIG. 7, the corner histogram generator 160 creates corner histograms at step S160.

The mean value calculator 182 of the model generator 180 accumulates video of corner histograms for calculating a mean value per a posture at step S154.

The mean value calculator 182 of the model generator 180 continuously generates and accumulates histograms to calculate the sample data. After accumulating all of the sample data, a mean value of three postures (standing up, sitting down, and laying down) including both side views and a rear view is calculated at step S156.

Accordingly, the model generator 180 stores the mean values of each posture at the storing unit 190 at step S158.

According to the certain embodiment of the present invention, video streams with motions made by a human, which are captured and transmitted from a camera, are processed as silhouette based contour information, and a front view, side views and a rear view of a posture of standing up, a posture of sitting down, and a posture of laying down can be determined in real time. Therefore, the object and the motion made by the object can be accurately determined.

The system and method for analyzing motions of an object according to the certain embodiments can be used to determine motions made in a current video frame. Therefore, it can be used to control a robot to provide a predetermined service or to make a predetermined motion based on the analyzing result.

Furthermore, the system and method for analyzing motions of an object according to the certain embodiments can be used to analyze the purpose of user's motion through recognizing motions made from a user, especially, child or the aged, and to control a robot to provide corresponding service dynamically to the recognition and analyzing results.

While the present invention has been shown and described in connection with the preferred embodiments, it will be apparent to those skilled in the art that modifications and variations can be made without departing from the spirit and scope of the invention as defined by the appended claims.

According to certain embodiments of the present invention.

What is claimed is:

1. A system for analyzing motions of an object comprising:
   a foreground detector for detecting a moving foreground object from an input image except a background image;
   a contour extractor for extracting silhouette contour of the detected foreground object;
   a model generator for generating mean value histogram models as references to determine motions of the object from an silhouette image inputted in real time;
   a corner histogram generator for generating corner histograms for corners of hierarchical multiband in the extracted contour signal; and a value of similarity measuring unit for calculating a value of similarity between the generated corner histogram of a current frame and the average model histogram in a histogram unit, measuring a value making a value of similarity with the calculated current frame histogram maximum, and determining the measured value as a posture of the object in the current frame.

2. The system according to claim 1, further comprising a filter for removing noise images from the foreground object image detected from the foreground detector and outputting the noise removed image to the contour extractor.

3. The system according to claim 2, wherein the filter is a low band pass filter or a morphological filter.

4. The system according to claim 1, further comprising a background model manager disposed at the front of the foreground detector for generating a Gaussian mixture background for input image frames,
wherein the foreground detector detects the foreground object making motions at a still background using differences between a background of the Gaussian mixture background model outputted from the background model manager and real-time input video frame.

5. The system according to claim 4, further comprising an image initializing unit for initializing the video frames for generating the Gaussian mixture background and outputting the initialized video frame to the background model manager.

6. The system according to claim 5, further comprising a camera unit for capturing video stream in real time and outputting the captured video stream to the image initializing unit and the foreground detector.

7. The system according to claim 1, wherein the corner points include at least one of a head, a hand, a leg, an armpit, a shoulder, and a knee of the object.

8. The system according to claim 1, further comprising a storing unit for storing average histogram models of each posture of the object, which are generated from the model generator.

9. The system according to claim 8, wherein the postures of the object include at least one of a posture of standing up, a posture of sitting down, and a posture of laying down.

10. The system according to claim 8, wherein the model generator includes:
a silhouette contour collector for collecting videos of postures of the object, and a front view, a left side view, a right side view, and a rear view of each of the postures; and
an mean value calculator for calculating mean values of the front view, the left side view, the right side view, and the rear view of each of the postures of the object by accumulating the collected videos, and storing the calculated mean values in the storing unit.

11. The system according to claim 8, wherein the corner histogram generator includes:
a centroid point calculator for calculating a weight centroid point of a silhouette in a silhouette object contour image inputted from the contour extractor;
an Euclidean distance calculator for calculating an Euclidean distance from the weight centroid point to predetermined points along the contour from a predetermined start point;
a multiband wavelet filter for dividing the Euclidean distance information into multi sub-band; and
a multiband corner histogram generator for generating corner histograms by extracting corners with positions thereof not varied form the divided multi sub-band signals.

12. The system according to claim 11, wherein the multiband wavelet filter divides the Euclidean distance information into eight multi sub-bands.

13. A method for analyzing motions of an object based on a silhouette of the object in video streams, comprising:
collecting video streams in real time;
detecting foreground objects making motions at a still background from the collected video stream;
filtering the detected foreground object image to remove noise images therefrom;
extracting contours of a silhouette from the noise removed object silhouette image;
generating a mean value histogram model as a reference to determine motions of the object from the real time input silhouette image;
generating a corner histogram in consideration of multiband feature of corner points from the extracted contour signal;
calculating a value of similarity between the generated corner histogram of a current frame and the average model histogram, and measuring a value making a value of similarity to the calculated histogram of a current frame maximum; and
determining the histogram of the measured maximum value of similarity as a current frame posture of the object.

14. The object motion analysis method according to claim 13, wherein the step of generating the average histogram model includes:
collecting silhouette contour image information of each posture of the object;
generating the corner histogram for the collected image information;
accumulating videos of the corner histograms to calculate an mean value of each posture;
calculating an mean value of each posture from the accumulated corner histograms; and
storing the calculated mean value of each posture.

15. The object motion analysis method according to claim 13, wherein the postures of the object includes at least one of a posture of standing up, a posture of sitting down, and a posture of laying down of the object.

16. The object motion analysis method according to claim 15, wherein the posture of the object further includes at least one of a front view, a left side view, a right side view, and a rear view of each of the postures of the object.

17. The object motion analysis method according to claim 13, wherein the corners includes at least one of a head, a hand, a leg, an armpit, a shoulder, and a knee.

18. The object motion analysis method according to claim 13, wherein the step of generating the corner histogram includes:
calculating a weight centroid point of the silhouette object contour image;
calculating Euclidean distances from the weight centroid point to predetermined points on the contour from a predetermined start point along the entire contour;
dividing the Euclidean distance signal into multi sub-bands through multiband wavelet filtering; and
generating the corner histogram by extracting corners having a position not varied up to a scale of $2^3$ for the filtered multiple band signals.

* * * * *